Oct. 20, 1959     R. C. BROWN     2,908,955
METAL FASTENING CLIP
Filed May 6, 1957
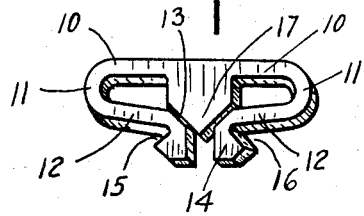
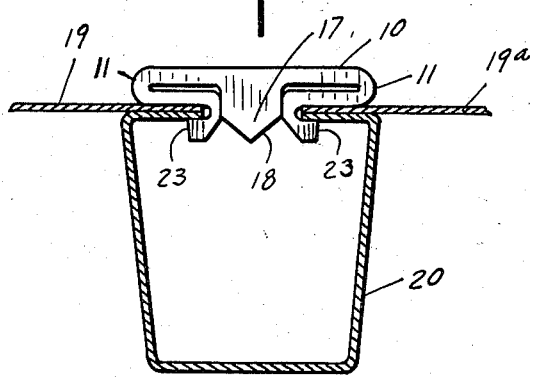
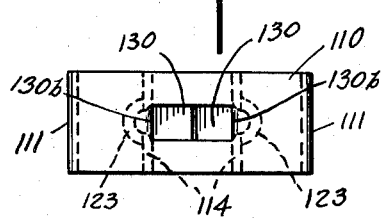
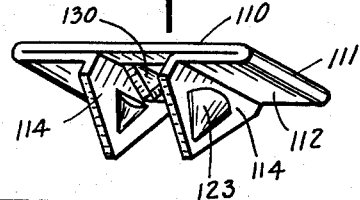
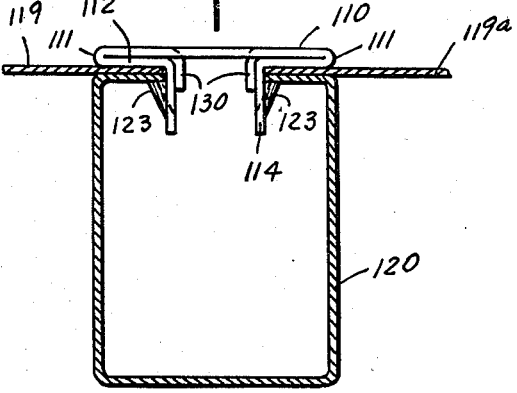
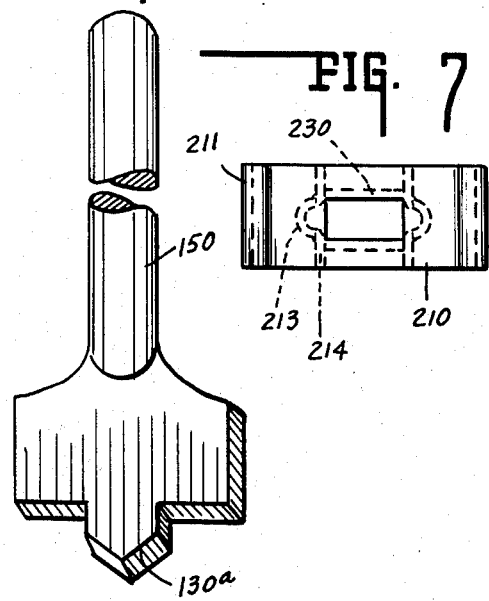
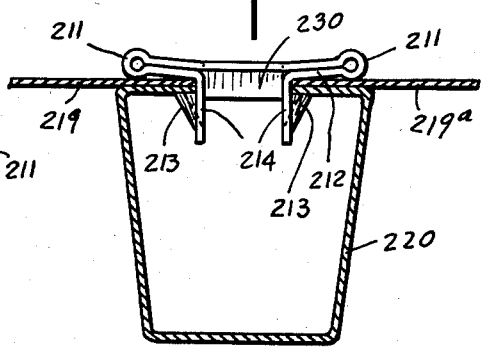
INVENTOR.
ROBERT C. BROWN.
BY
Lockwood, Galt, Woodard & Smith
ATTORNEYS

United States Patent Office 2,908,955
Patented Oct. 20, 1959

2,908,955

METAL FASTENING CLIP

Robert C. Brown, Indianapolis, Ind., assignor to Metal Decking Corporation, Indianapolis, Ind., a corporation of Indiana Application May 6, 1957, Serial No. 657,076

1 Claim. (Cl. 24—73)

This invention relates to a metal fastening clip, and more particularly to a fastener for securing metal decking in position on sub-purlins.

Heretofore in the construction field there has existed the problem of securing flooring or decking panels to their supports in the form of sub-purlins or the like. It has been more or less standard practice to drive nails into corrugated openings, the nails being bent as they are driven home, to the conformation of the corrugations. While this type of securing or anchoring device has advantages it also has many disadvantages, such for example as a twisting installation, small hold-down surface and others which are well known to the trade.

It is the primary object of the present invention to provide an improved fastener that is characterized by a positive locking action, and which removes the disadvantages of the conventional fasteners.

It is a further object of the present invention to provide a fastener which will have a firm vise-like grip thereby assuring the permanent and rigid connection of the decking and their supporting members such as the sub-purlins.

It is a still further object of the present invention to afford a non-twisting installation which is designed to speed assembly erection.

It is a still further object of the present invention to provide a stronger and more rigid fastener which will readily withstand the stresses, pressures and strains to which construction materials are constantly subjected.

A still further object is to provide a fastener of such construction that a greater holddown surface is provided, this characteristic itself lending or contributing to the advantage of rigidity and strength in the fastener.

Still further objects of the present invention are to provide (1) a spring action installation, (2) a deck bracing action to the sub-purlin, and (3) an inexpensive, simple and yet most effective fastener that may be rapidly and easily applied to the work.

The full nature of the invention will be understood from the accompanying drawings and the following description and claim:

In the drawings:

Fig. 1 is a perspective view of the invention.

Fig. 2 is a side elevation view thereof in locking position, the metal decking and sub-purlin being shown in section.

Fig. 3 is a top plan view of a modified form of the invention.

Fig. 4 is a perspective view of the modification shown in Fig. 3.

Fig. 5 is a side elevation view of the Fig. 3 modification, it being shown after it has been driven into locking position with the decking and panel shown in cross section.

Fig. 6 is a perspective view of a magnetized working tool that is used to apply the Fig. 7 modification of the invention.

Fig. 7 is a top plan view of a second modification of the invention.

Fig. 8 is a side elevation view of the Fig. 7 modification after it has been driven into locking position, the metal decking and the sub-purlin being shown in section.

In the drawings the principal embodiment of the invention is illustrated in Figs. 1 and 2 wherein the fastener is shown to comprise a one-piece stamping. Oppositely extending arms 10 are provided, they being reversely bent, i.e. bent back upon themselves to form the loops 11 and the slightly inclined legs 12. These legs have a flat cam surface 13 and terminate in slightly enlarged foot portions 14.

It will be noticed in Fig. 1 that flat shoulder forming portions 15 extend normal or perpendicular to flat surfaces 13 when the fastener is in its original before-use condition; and that the notch 16 separates that portion from the adjacent body portion of the arms. It will also be noted that by providing the shoulder-forming portions and the notches opposite the cam surfaces, the fastener is sufficiently weakened in that area to facilitate the fastening action of the wedge or cam 17 without, however, impairing in any manner the effectiveness of the fastener.

The wedge has cam surfaces 18 that generally correspond in inclination or angularity to that of the cam surfaces previously identified.

The fastener shown in Figs. 1 and 2 is narrow in its width, it being on the order of approximately one-eighth of an inch. In use the fastener will be employed to anchor or fixedly connect the aluminum or other metal decking panels 19 and 19a to the sub-purlin 20. The fastener will be placed in the position previously marked by the workman, and will then be driven through the openings between the adjacent sections of decking on the one hand and the sub-purlin on the other. The impact of the hammer or other suitable driving tool will force the wedge downwardly, the arms of the fastener also being driven downwardly until they lie in close proximity to the legs.

As the wedge is forced downwardly, faces 23 of the feet will separate or laterally displace the adjacent edges of the decking and the sub-purlins a sufficient distance to pass the feet. Once the feet are passed, the panels and the sub-purlin will snap back to their previous position. This occurs because of the existence of the notches in which the edges of the panels and sub-purlins will be entrapped, and rigidly held in locked position.

As will be observed from Fig. 2, the originally inclined cam surfaces 13 will now be substantially vertical relative to the plane of the panels, and the shoulder forming portions 15 will be substantially horizontal, i.e. parallel to that plane. The net result is that the portions of the fastener that define the notches have been cammed or wedged into a vise-like grip position relative to the panels and sub-purlins. A strong, rigid lock has thus been provided to hold the assembled panels and sub-purlins together.

In the modification of the invention shown in Figs. 3, 4 and 5 the width of the invention is substantially increased as shown. The top arm or plate 110 has the loop or return bend portion 111 and the legs 112. These legs immediately underlie the plate and terminate in depending substantially triangular flexible feet 114 that extend substantially at right angles to the plane of the legs and arms.

Each foot is provided with a cone-shaped cam 123 which serves the same function as the cam members 23 in the principal embodiment of the invention.

Extending intermediate the opposed vertically directed feet are the downwardly struck and hinged locking elements or flaps 130. As will be observed in Fig. 3, the end edges or free ends of these elements normally are in proximity, almost abutting. This is so that a rather broad surface will be exposed to the complementary faces 130a of the magnetized driving tool 150 (see Fig. 6). It will also be observed that the hinges 130b of the locking elements immediately overlie the upper extremities of the feet.

In use, this modification will be placed in position on the mating faces of the magnetized tool. Upon locating the fastener in the desired position the tool will be forced downwardly by a driving implement. As the fastener is driven through the openings in the metal decking panels 119 and 119a and in the sub-purlin 120 the cone-shaped cams and feet will yield or flex inwardly and will pass between the adjacent edges of the decking and the sub-purlins. Once this is accomplished the feet will snap back to their previous position and at that time will firmly secure the panel and the sub-purlin within the notches formed by the upper face of the cone-shaped cams and the lower face of legs 112.

As the foregoing action takes place the locking elements 130 will also be forced inwardly to the position shown in Fig. 5. In this position they serve to retain the feet and their integral cone-shaped cams in decking and sub-purlin locking condition. The action is, of course, almost instantaneous, and the driving tool may readily and easily be withdrawn once it is completed.

A third modification of the invention is shown in Figs. 7 and 8. The upper arms 210 form a more pronounced return bend or loop portion 211 that leads to the legs 212. This modification also is characterized by the cone-shaped cams 213 which are integral with the feet 214. The basic difference, however, between this modification and that shown in Figs. 3, 4 and 5 lies in the provision of the longitudinally rather than transversely extending locking elements 230. These elements are in engagement at their opposite ends with the opposed feet and for that reason act as a wedge or guard to keep the feet always at the same distance apart. At least the feet are not permitted to come closer together.

In use this modification of the fastener will also be properly located at the point where it is to be "driven home," whereupon a suitable driving tool is employed to force the fastener downwardly through the opening between the adjacent edges of the sub-purlin. As it is so driven down the cones will laterally displace or flex the adjacent edges of the sub-purlin 220 until the cone has passed therethrough. At such time the edges or flanges of the sub-purlin will flex together to approximately their original position at which time they will be located along with the metal decking 219 and 219a in the groove or notch formed by the upper face of the cone-shaped cam 213 and the lower face of the legs 212. Because of the particular construction of the fastener the decking and the sub-purlin will be locked in place.

While the invention has been illustrated and described in detail in the drawings and foregoing description, the same is to be considered as illustrative and not restrictive in character.

The several modifications described herein as well as others which will readily suggest themselves to persons skilled in this art, all are considered to be within the broad scope of the invention, as defined in the appended claim.

The invention claimed is:

A fastener for securing one or more members to a sub-purlin having an opening defined by a pair of spaced edge portions, comprising a plate having downwardly extending hinged locking elements initially extending so that their free ends are in proximate relation to provide a surface adapted to be engaged by complementary faces of a driving tool, said plate having inwardly converging flexed legs underlying said plate and being substantially parallel therewith, said legs terminating in depending spaced flexible feet having cone shaped cams for locking engagement with said edge portions of the sub-purlin whereby said feet are inwardly flexed as they are driven through said opening by the impact of said tool, said legs and said cams defining a notch for the reception of said edge portions in locking relation upon said feet and snapping back to normal relation upon passing said edge portions, said locking elements being adapted to be forced by the impact of said tool into engagement with the inner faces of said feet for retaining said feet in locking position.

References Cited in the file of this patent

UNITED STATES PATENTS

| | | |
|---|---|---|
| 2,330,770 | Wiley | Sept. 28, 1943 |
| 2,611,166 | Wiley | Sept. 23, 1952 |
| 2,720,289 | Hendrickson | Oct. 11, 1955 |
| 2,748,645 | Peckham et al. | June 5, 1956 |

FOREIGN PATENTS

| | | |
|---|---|---|
| 678,603 | Great Britain | Sept. 3, 1952 |
| 829,620 | France | Apr. 5, 1938 |